US010366076B1

(12) United States Patent
Yu

(10) Patent No.: US 10,366,076 B1
(45) Date of Patent: Jul. 30, 2019

(54) SYSTEMS AND METHODS FOR REPAIRING CORRUPTED DATA SEGMENTS IN DEDUPLICATED DATA SYSTEMS

(71) Applicant: Veritas Technologies, LLC, Mountain View, CA (US)

(72) Inventor: Junheng Yu, Sichuan (CN)

(73) Assignee: Veritas Technologies LLC, Santa Clara, CA (US)

( * ) Notice: Subject to any disclaimer, the term of this patent is extended or adjusted under 35 U.S.C. 154(b) by 535 days.

(21) Appl. No.: 15/147,862

(22) Filed: May 5, 2016

(51) Int. Cl.
*G06F 16/23* (2019.01)
*G06F 16/174* (2019.01)
*G06F 16/215* (2019.01)

(52) U.S. Cl.
CPC ...... *G06F 16/2365* (2019.01); *G06F 16/1748* (2019.01); *G06F 16/215* (2019.01)

(58) Field of Classification Search
CPC ......... G06F 17/30371; G06F 17/30165; G06F 17/30303; G06F 16/2365; G06F 16/215; G06F 16/1748
USPC .................................................. 707/690, 692
See application file for complete search history.

(56) References Cited

U.S. PATENT DOCUMENTS

| 7,913,114 | B2* | 3/2011 | Leppard | G06F 11/2094 714/15 |
| 9,959,179 | B1* | 5/2018 | Yu | G06F 11/1469 |
| 9,990,254 | B1* | 6/2018 | Bayliss | G06F 11/1435 |
| 2003/0101167 | A1* | 5/2003 | Berstis | G06F 16/10 707/E17.005 |
| 2007/0260651 | A1* | 11/2007 | Pedersen | G06F 16/30 707/E17.058 |
| 2010/0325666 | A1* | 12/2010 | Wiser | H04N 7/17336 725/44 |
| 2015/0012503 | A1* | 1/2015 | Akirav | G06F 16/1748 707/692 |
| 2015/0067754 | A1* | 3/2015 | Wiser | H04N 21/2668 725/120 |

\* cited by examiner

*Primary Examiner* — Phong H Nguyen
(74) *Attorney, Agent, or Firm* — FisherBroyles, LLP

(57) ABSTRACT

A computer-implemented method for repairing corrupted data segments in deduplicated data systems may include (1) identifying a corrupted data segment within a deduplicated data system, (2) locating backed up versions of a first file and backed up versions of a second file, (3) analyzing a first pattern with which the backed up versions of the first file reference the corrupted data segment and a second pattern with which the backed up versions of the second file reference the corrupted data segment, (4) determining that a first location within an instance of the first file is more likely to include a non-corrupt instance of the corrupted data segment than is a second location within an instance of the second file, (6) retrieving the non-corrupt instance of the corrupted data segment from the first location, and (7) repairing the corrupted data segment. Various other methods, systems, and computer-readable media are also disclosed.

20 Claims, 7 Drawing Sheets

SYSTEMS AND METHODS FOR REPAIRING CORRUPTED DATA SEGMENTS IN DEDUPLICATED DATA SYSTEMS

BACKGROUND

Deduplicated data systems are often able to reduce the amount of space required to store files by recognizing redundant data patterns. For example, a deduplicated data system may reduce the amount of space required to store similar files by dividing the files into data segments and storing only unique data segments. In this example, each deduplicated file may simply consist of a list of data segments that make up the file.

Unfortunately, while conventional deduplicated data systems may reduce the space required to store files, these deduplicated data systems may also reduce storage reliability. For example, if one hundred files each reference a single unique data segment, the loss and/or corruption of the single data segment within the deduplicated data system may result in the loss and/or corruption of all one hundred files.

Furthermore, attempts to repair a corrupted data segment may impose an administrative burden and may be computationally expensive. For example, requiring an administrator to locate and provide an intact duplicate copy of the data stored by the deduplication system to allow the deduplication system to reprocess the data and replace the corrupted data segment may involve large copy, transfer, and data processing operations, as well as taking up the administrator's time and introducing possibilities for confusion, uncertainty, and human error.

Accordingly, the instant disclosure identifies and addresses a need for additional and improved systems and methods for repairing corrupted data segments in deduplicated data systems.

SUMMARY

As will be described in greater detail below, the instant disclosure generally relates to systems and methods for repairing corrupted data segments in deduplicated data systems by locating series of backups that reference a corrupted data segment, determining which files in the series of backups most reliably reference the corrupted data segment (e.g., most consistently reference the corrupted data segment across versions of a file and/or in a given location within the file), systematically checking the sources of and/or clean copies of the best candidate files for a non-corrupt instance of the data segment, and then fetching only the non-corrupt instance of the data segment for use in repairing the corrupted data segment.

In one example, a computer-implemented method for repairing corrupted data segments in deduplicated data systems may include (1) identifying a corrupted data segment within a deduplicated data system, (2) in response to identifying the corrupted data segment within the deduplicated data system, (i) locating a group of backed up versions of a first file, at least one version of the first file within the backed up versions of the first file referencing the corrupted data segment, and (ii) locating a group of backed up versions of a second file, at least one version of the second file within the versions of the second file referencing the corrupted data segment, (3) analyzing a first pattern across the backed up versions of the first file with which the backed up versions of the first file reference the corrupted data segment and a second pattern across the backed up versions of the second file with which the backed up versions of the second file reference the corrupted data segment, (4) determining, based at least in part on a difference between the first pattern across the backed up versions of the first file and the second pattern across the backed up versions of the second file, that a first location within an instance of the first file is more likely to include a non-corrupt instance of the corrupted data segment than is a second location within an instance of the second file, (5) retrieving, based at least in part on determining that the instance of the first file is more likely to include the non-corrupt instance of the corrupted data segment, the non-corrupt instance of the corrupted data segment from the first location within the instance of the first file, and (6) repairing the corrupted data segment with the non-corrupt instance of the corrupted data segment.

In some examples, retrieving the non-corrupt instance of the corrupted data segment from the first location may include retrieving the non-corrupt instance of the corrupted data segment without retrieving an entire copy of the instance of the first file.

In some examples, retrieving the non-corrupt instance of the corrupted data segment from the first location within the instance of the first file may include retrieving the non-corrupt instance of the corrupted data segment from a source from which the backup versions of the first file were taken.

In some examples, retrieving the non-corrupt instance of the corrupted data segment from the first location within the instance of the first file may include retrieving the non-corrupt instance of the corrupted data segment from a backup stored outside the deduplicated data system.

In some examples, the computer-implemented method may further include checking a fingerprint at the first location within the instance of the first file to determine that a data segment at the first location within the instance of the first file may include the non-corrupt instance of the corrupted data segment before retrieving the non-corrupt instance of the corrupted data segment.

In some examples, the computer-implemented method may further include selecting the first location within the instance of the first file based on a location within one or more of the backed up versions of the first file at which the corrupted data segment is referenced.

In some examples, determining that the first location within the instance of the first file is more likely to include the non-corrupt instance of the corrupted data segment than is the second location within the instance of the second file may include determining that the corrupted data segment is referenced across the backed up versions of the first file more consistently than the corrupted data segment is referenced across the backed up versions of the second file.

In some examples, determining that the first location within the instance of the first file is more likely to include the non-corrupt instance of the corrupted data segment than is the second location within the instance of the second file may include determining that the corrupted data segment is referenced at the first location across the backed up versions of the first file more consistently than the corrupted data segment is referenced at the second location across the backed up versions of the second file.

In some examples, determining that the first location within an instance of the first file is more likely to include the non-corrupt instance of the corrupted data segment than is the second location within the instance of the second file may include determining that a proximity between a timestamp of a backed up version of the first file that references the corrupted data segment and a timestamp of the instance of the first file exceeds a proximity between a timestamp of a backed up version of the second file that references the corrupted data segment and a timestamp of the instance of the second file.

In some examples, retrieving the non-corrupt instance of the corrupted data segment from the first location within the instance of the first file is based at least in part on determining that the first file is smaller than the second file.

In some examples, determining that the first location within the instance of the first file is more likely to include the non-corrupt instance of the corrupted data segment than is the second location within the instance of the second file may include: calculating a ranking across a group of files that includes the first file and the second file and determining that the first file precedes the second file in the ranking.

In one embodiment, a third file may precede the first file in the ranking. In this embodiment, the computer-implemented method may further include checking a fingerprint at a third location within an instance of the third file and thereby determining that a data segment at the third location within the instance of the third file does not include the non-corrupt instance of the corrupted data segment. In this embodiment, retrieving the non-corrupt instance of the corrupted data segment from the first location within the instance of the first file instead of from the third location within the instance of the third file may be based at least in part on determining that the data segment at the third location within the instance of the third file does not include the non-corrupt instance of the corrupted data segment and at least in part on the first file succeeding the third file in the ranking.

In some examples, retrieving the non-corrupt instance of the corrupted data segment from the first location may include retrieving the non-corrupt instance of the corrupted data segment without reading portions of the instance of the first file other than the non-corrupt instance of the corrupted data segment.

In some examples, retrieving the non-corrupt instance of the corrupted data segment from the first location may include requesting a backup of a single data segment at the first location of the instance of the first file.

In one embodiment, a system for implementing the above-described method may include (1) an identification module, stored in memory, that identifies a corrupted data segment within a deduplicated data system, (2) a location module, stored in memory, that, in response to identifying the corrupted data segment within the deduplicated data system, (i) locates a group of backed up versions of a first file, at least one version of the first file within the backed up versions of the first file referencing the corrupted data segment, and (ii) locates a group of backed up versions of a second file, at least one version of the second file within the versions of the second file referencing the corrupted data segment, (3) an analysis module, stored in memory, that analyzes a first pattern across the backed up versions of the first file with which the backed up versions of the first file reference the corrupted data segment and a second pattern across the backed up versions of the second file with which the backed up versions of the second file reference the corrupted data segment, (4) a determination module, stored in memory, that determines, based at least in part on a difference between the first pattern across the backed up versions of the first file and the second pattern across the backed up versions of the second file, that a first location within an instance of the first file is more likely to include a non-corrupt instance of the corrupted data segment than is a second location within an instance of the second file, (5) a retrieving module, stored in memory, that retrieves, based at least in part on determining that the instance of the first file is more likely to include the non-corrupt instance of the corrupted data segment, the non-corrupt instance of the corrupted data segment from the first location within the instance of the first file, (6) a repairing module, stored in memory, that repairs the corrupted data segment with the non-corrupt instance of the corrupted data segment, and (7) at least one physical processor configured to execute the identification module, the location module, the analysis module, the determination module, the retrieving module, and the repairing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a corrupted data segment within a deduplicated data system, and, in response to identifying the corrupted data segment within the deduplicated data system: (2) (i) locate a group of backed up versions of a first file, at least one version of the first file within the backed up versions of the first file referencing the corrupted data segment, and (ii) locating a group of backed up versions of a second file, at least one version of the second file within the versions of the second file referencing the corrupted data segment, (3) analyze a first pattern across the backed up versions of the first file with which the backed up versions of the first file reference the corrupted data segment and a second pattern across the backed up versions of the second file with which the backed up versions of the second file reference the corrupted data segment, (4) determine, based at least in part on a difference between the first pattern across the backed up versions of the first file and the second pattern across the backed up versions of the second file, that a first location within an instance of the first file is more likely to include a non-corrupt instance of the corrupted data segment than is a second location within an instance of the second file, (5) retrieve, based at least in part on determining that the instance of the first file is more likely to include the non-corrupt instance of the corrupted data segment, the non-corrupt instance of the corrupted data segment from the first location within the instance of the first file, and (6) repair the corrupted data segment with the non-corrupt instance of the corrupted data segment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
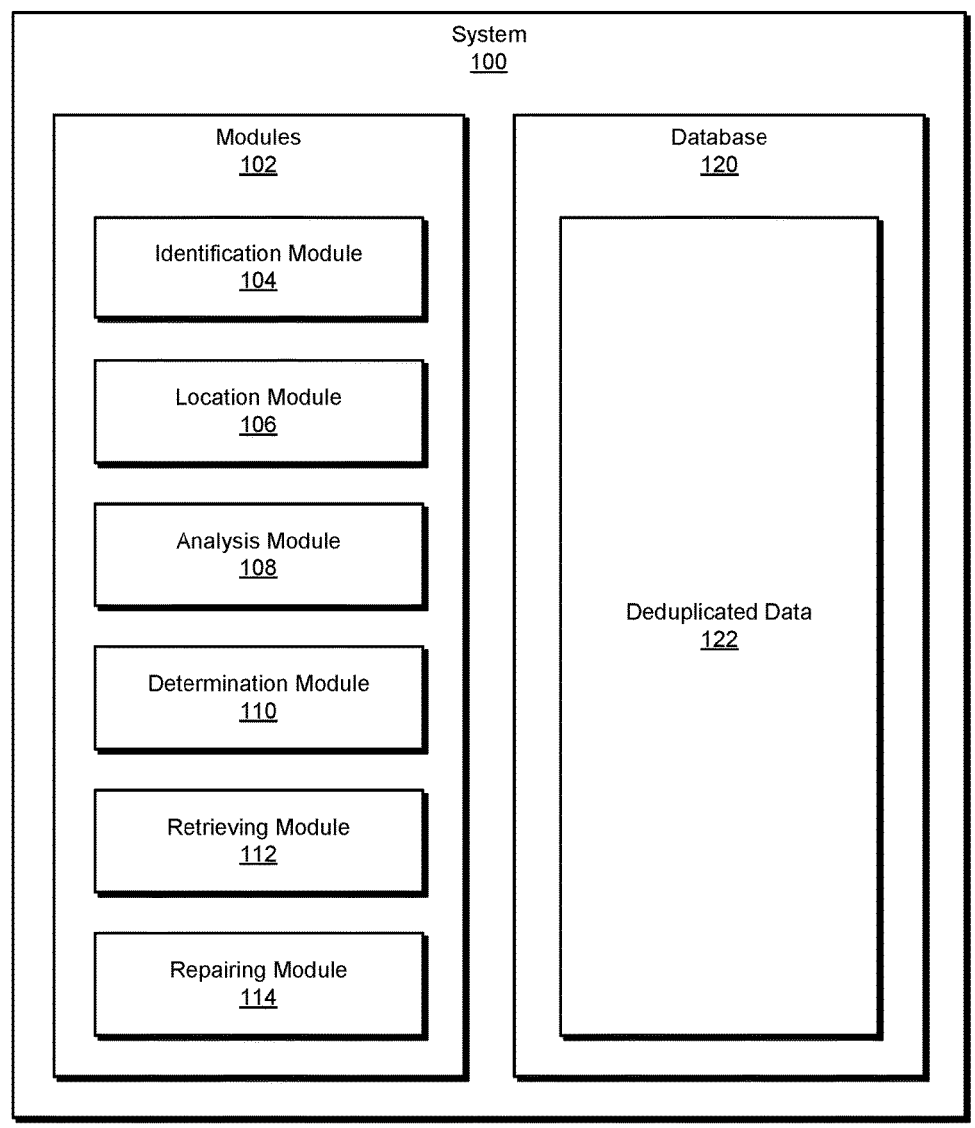
FIG. 1 is a block diagram of an exemplary system for repairing corrupted data segments in deduplicated data systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for repairing corrupted data segments in deduplicated data systems. As will be explained in greater detail below, by locating series of backups that reference a corrupted data segment, determining which files in the series of backups most reliably reference the corrupted data segment (e.g., most consistently reference the corrupted data segment across versions of a file and/or in a given location within the file), systematically checking the sources of and/or clean copies of the best candidate files for a non-corrupt instance of the data segment, and then fetching only the non-corrupt instance of the data segment for use in repairing the corrupted data segment, the systems and methods described herein may automatically, reliably, efficiently, and quickly repair corruption in deduplicated data systems. These systems and methods may thus avoid repair operations involving copying and processing entire image streams, which may be computationally expensive, which may delay repair times and which may require administrator input (thereby imposing administrative costs and delays and introducing human error).

The following will provide, with reference to FIGS. 1-2 and 4-5, detailed descriptions of exemplary systems for repairing corrupted data segments in deduplicated data systems. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for repairing corrupted data segments in deduplicated data systems. As illustrated in this figure, exemplary system 100 may include one or more modules 102 for performing one or more tasks. For example, and as will be explained in greater detail below, exemplary system 100 may include an identification module 104 that identifies a corrupted data segment within a deduplicated data system. Exemplary system 100 may additionally include a location module 106 that (1) locates a plurality of backed up versions of a first file, at least one version of the first file within the plurality of backed up versions of the first file referencing the corrupted data segment, and (2) locates a plurality of backed up versions of a second file, at least one version of the second file within the plurality of versions of the second file referencing the corrupted data segment. Exemplary system 100 may also include an analysis module 108 that analyzes a first pattern across the plurality of backed up versions of the first file with which the plurality of backed up versions of the first file reference the corrupted data segment and a second pattern across the plurality of backed up versions of the second file with which the plurality of backed up versions of the second file reference the corrupted data segment. Exemplary system 100 may additionally include a determination module 110 that determines, based at least in part on a difference between the first pattern across the plurality of backed up versions of the first file and the second pattern across the plurality of backed up versions of the second file, that a first location within an instance of the first file is more likely to comprise a non-corrupt instance of the corrupted data segment than is a second location within an instance of the second file. Exemplary system 100 may also include a retrieving module 112 that retrieves, based at least in part on determining that the instance of the first file is more likely to comprise the non-corrupt instance of the corrupted data segment, the non-corrupt instance of the corrupted data segment from the first location within the instance of the first file. Exemplary system 100 may additionally include a repairing module 114 that repairs the corrupted data segment with the non-corrupt instance of the corrupted data segment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, computing system 206, computing system 207, and/or deduplicated system 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store deduplicated data 122.

Database 120 may represent portions of a single database or computing device or a plurality of databases or computing devices. For example, database 120 may represent a portion of deduplicated data system 208 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 and/or deduplicated data system 208 in FIG. 2, computing system 610 in FIG. 6, and/or portions of exemplary network architecture 700 in FIG. 7.

Figure 2:
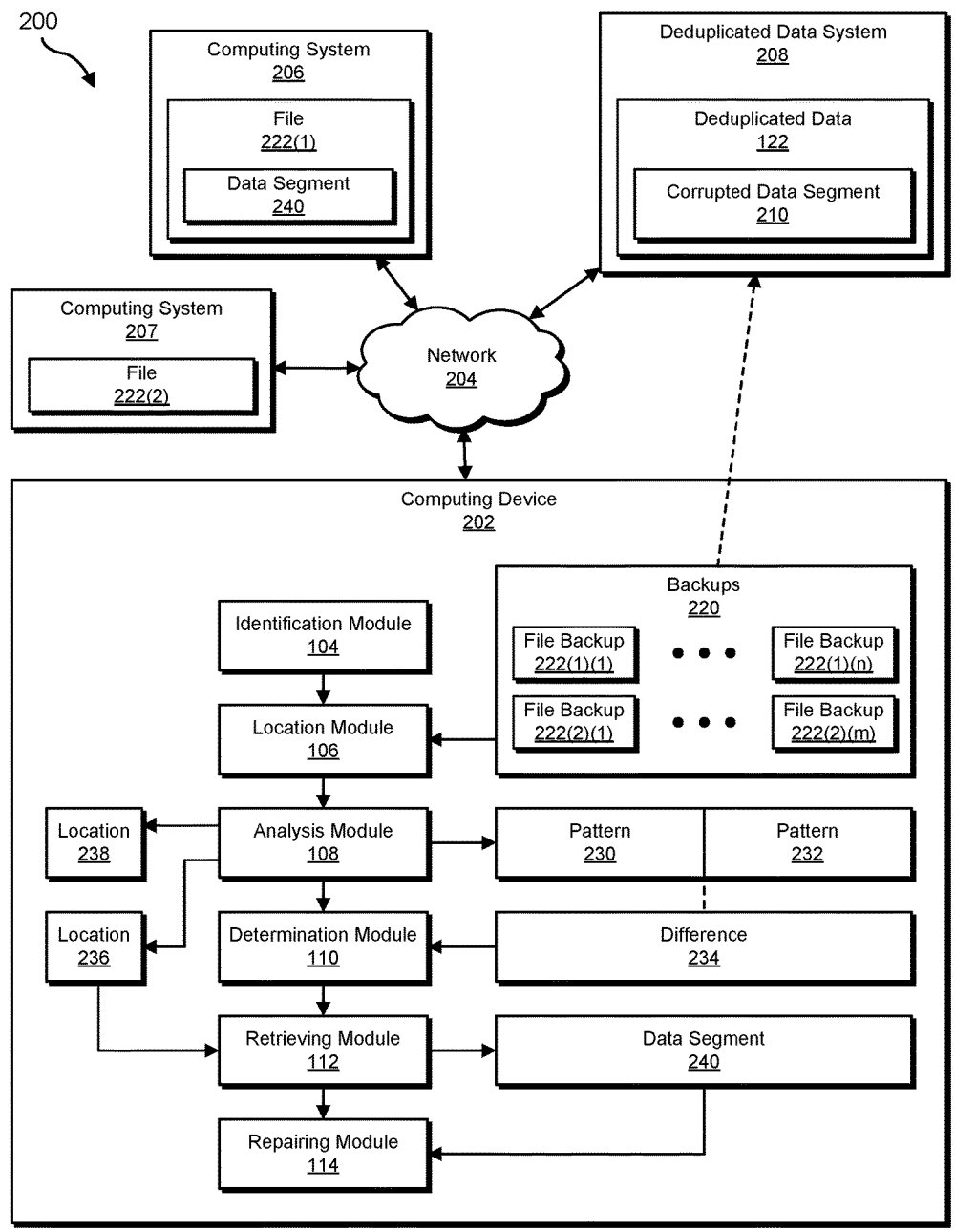
FIG. 2 is a block diagram of an additional exemplary system for repairing corrupted data segments in deduplicated data systems.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing system 206, a computing system 207, and/or a deduplicated data system 208 via a network 204. In one example, computing device 202 may be programmed with one or more of modules 102 and/or may store all or a portion of the data in database 120. Additionally or alternatively, deduplicated data system 208 may be programmed with one or more of modules 102 and/or may store all or a portion of the data in database 120.

In one embodiment, one or more of modules 102 from FIG. 1 may, when executed by at least one processor of computing device 202 and/or deduplicated data system 208, enable computing device 202 and/or deduplicated data system 208 to repair deduplicated data segments in deduplicated data system 208 (e.g., to repair a corrupted data segment 210). For example, and as will be described in greater detail below, one or more of modules 102 may cause computing device 202 and/or deduplicated data system 208 to repair corrupted data segment 210 in deduplicated data system 208 with a non-corrupted instance of corrupted data segment 210 (e.g., a data segment 240). For example, and as will be described in greater detail below, identification module 104 may identify corrupted data segment 210 within deduplicated data system 208. Location module 106 may locate backups 220 of a file 222(1) (e.g., file backups 222(1)(1)-222(1)(n)), at least one version of file 222(1) within backups 220 of file 222(1) (e.g., at least one of file backups 222(1)(1)-222(1)(n)) referencing corrupted data segment 210, and locate backups 220 of a file 222(2) (e.g., file backups 222(2)(1)-222(2)(m)), at least one version of file 222(2) within the plurality of versions of file 222(2) (e.g., at least one of file backups 222(2)(1)-222(2)(m)) referencing corrupted data segment 210. Analysis module 108 may analyze a pattern 230 across backups 220 of file 222(1) (e.g., across file backups 222(1)(1)-222(1)(n)) with which backups 220 of file 222(1) reference corrupted data segment 210 and a pattern 232 across backups 220 of file 222(2) (e.g., across file backups 222(2)(1)-222(2)(m)) with which backups 220 of file 222(2) reference corrupted data segment 210. Determination module 110 may determine, based at least in part on a difference 234 between pattern 230 across backups 220 of file 222(1) and pattern 232 across backups 220 of file 222(2), that a location 236 within an instance of file 222(1) (e.g., file 222(1) stored on computing system 206) is more likely to comprise a non-corrupt instance 240 of corrupted data segment 210 than is a location 238 within an instance of file 222(2) (e.g., file 222(2) stored on computing system 207). Retrieving module 112 may retrieve, based at least in part on determining that the instance of file 222(1) is more likely to comprise non-corrupt instance 240 of corrupted data segment 210, non-corrupt instance 240 of corrupted data segment 210 from location 236 within the instance of file 222(1). Repairing module 114 may repair corrupted data segment 210 with non-corrupt instance 240 of corrupted data segment 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Computing systems 206 and 207 generally represent any type or form of computing device capable of reading computer-executable instructions. Examples of computing systems 206 and 207 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In some examples, a backup system may periodically backup data on computing systems 206 and 207 (e.g., files 222(1) and 222(2), respectively), contributing to backups 220 capturing backups of data stored on 206 and 207 at various points in time. Additionally, in some examples, the backup system may store backups 220 in deduplicated data system 208, such that backups 220 are stored as a series of references to deduplicated data segments stored as deduplicated data 122.

Deduplicated data system 208 may be any type or form of computing device that is capable of deduplicating data and/or storing, retrieving, relaying, accessing, and/or managing deduplicated data. Examples of deduplicated data system 208 include, without limitation, storage arrays, deduplication appliances, and servers configured with deduplication systems.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), a Storage Area Network (SAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and computing system 206, computing system 207, and/or deduplicated data system 208.

Figure 3:
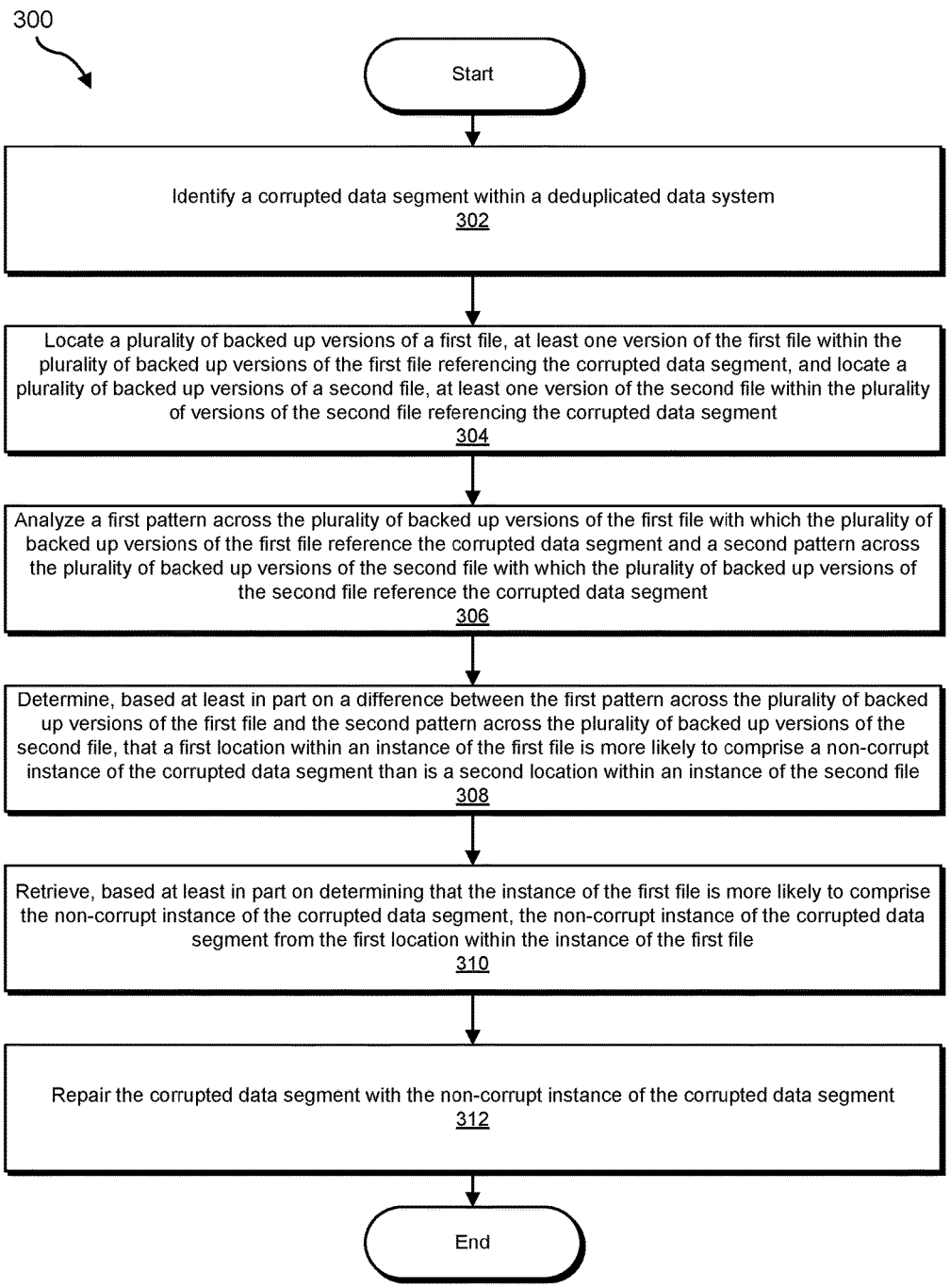
FIG. 3 is a flow diagram of an exemplary method for repairing corrupted data segments in deduplicated data systems.

FIG. 3 is a flow diagram of an exemplary computer-implemented method 300 for repairing corrupted data segments in deduplicated data systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a corrupted data segment within a deduplicated data system. For example, identification module 104 may, as part of computing device 202 in FIG. 2, identify corrupted data segment 210 within deduplicated data system 208.

The term "deduplicated data system," as used herein, generally refers to any type or form of storage device and/or mechanism capable of deduplicating data and/or managing deduplicated data. For example, a deduplicated data system may include a storage system, device, and/or appliance that identifies redundant data patterns within a collection of data and eliminates such redundancy by only storing a single instance of data. In some examples, the deduplicated data system may deduplicate data segments across multiple backup images. Examples of deduplicating data systems may include, without limitation, NETBACKUP PUREDISK, NETBACKUP SURESCALE, and/or BACKUP EXEC, COMMVAULT SIMPANA SOFTWARE, and/or EMC DATA DOMAIN.

As used herein, the phrase "data segment" may refer to any unit of data that may be stored as a deduplicated unit within a deduplicated data system. Examples of a data segment include, but are not limited to, a portion of a file, a portion of an image, a data block, a portion of a data stream, and/or a database entry. In some examples, a deduplicated data system may track and identify unique data segments by generating and/or storing fingerprints derived from the data segments (e.g., values derived from data segments that, with high probability, uniquely identify their respective data segments).

The term "corrupted data segment," as used herein, generally refers to a data segment that is altered, overwritten, missing, and/or otherwise does not correctly represent information intended to be stored by the data segment. For example, a file to be stored in a deduplicated data system may be segmented and each new data segment of the file (e.g., each data segment not previously encountered within the deduplicated data system) may be stored in the deduplicated data system. After a new data segment is stored within a deduplicated data system, subsequent files stored to the deduplicated data system may yield the same data segment. Accordingly, these files may reference the data segment rather than storing another instance of the data segment within the deduplicated data system. However, due to a failure (e.g., a storage failure, a computing failure, human error, physical damage to computing infrastructure, etc.), the data segment may be erroneously altered, removed, and/or become inaccessible. Accordingly, the now-corrupted data segment may corrupt each file stored by the deduplicated data system that references the corrupted data segment.

Identification module 104 may identify the corrupted data segment within the deduplicated data system in any of a variety of ways. For example, identification module 104 may identify the corrupted data segment by identifying a request to repair the corrupted data segment. Additionally or alternatively, identification module 104 may identify the corrupted data segment by determining that the corrupted data segment does not match a fingerprint generated from a non-corrupted version of the corrupted data segment (e.g., before the corrupted data segment was corrupted). In some examples, identification module 104 may identify the corrupted data segment by identifying a failure implicating the corrupted data segment (e.g., a storage failure, an application failure, a processing failure, a device failure, etc.). In some examples, identification module 104 may identify the corrupted data segment by receiving a request to verify the integrity of the corrupted data segment.

Identification module 104 may identify the corrupted data segment in any suitable context. For example, identification module 104 may operate as a part of a deduplicated data system and identify the corrupted data segment from within and/or as a part of the deduplicated data system.

Returning to FIG. 3, at step 304, one or more of the systems described herein may locate a plurality of backed up versions of a first file, at least one version of the first file within the plurality of backed up versions of the first file referencing the corrupted data segment, and locate a plurality of backed up versions of a second file, at least one version of the second file within the plurality of versions of the second file referencing the corrupted data segment. For example, location module 106 may, as part of computing device 202 in FIG. 2, locate backups 220 of a file 222(1) (e.g., file backups 222(1)(1)-222(1)(n)), at least one version of file 222(1) within backups 220 of file 222(1) (e.g., at least one of file backups 222(1)(1)-222(1)(n)) referencing corrupted data segment 210, and locate backups 220 of a file 222(2) (e.g., file backups 222(2)(1)-222(2)(m)), at least one version of file 222(2) within the plurality of versions of file 222(2) (e.g., at least one of file backups 222(2)(1)-222(2)(m)) referencing corrupted data segment 210.

As used herein, the term "file" may refer to any data object (or portion of a data object) that may be stored via deduplicated data system (e.g., a data object that may be segmented, whose unique data segments may be stored within the deduplicated data system, and that may be subsequently stored as a series of references to data segments stored by the deduplicated data system). For example, the term "file" may refer to a file within a backup image of a collection of files (e.g., where the backup image of the collection of files is stored via a deduplicated data system) and/or a database element stored within a backup image of a database.

The term "backed up version," as used herein, generally refers to a version of a file as the file existed at a point in time at which a backup of the file was taken. For example, a deduplicated data system may store multiple backed up versions of the same file, representing the state of the file at various points in time.

Location module 106 may locate the backed up versions of the first file and the backed up versions of the second file in any of a variety of ways. For example, location module 106 may identify which backups stored by the deduplicated data system reference the corrupted data segment. In some examples, location module 106 may then group the backups according to the source of the backup. Location module 106 may then, for each group of backups, find a list of source files that reference the corrupted data segment. Thus, location module 106 may, for each original file that at some point included the original data segment, generate a list of versions of the file across time (as backup images that included the file were created). Accordingly, location module 106 may identify multiple (e.g., at least two) files, each file being preserved at multiple points in time by the backups stored in the deduplicated data system.

Location module 106 may locate the backed up versions of the first file and the backed up versions of the second file in any suitable context. For example, location module 106 may operate as a part of the deduplicated data system and locate the backed up versions of the first and second files as a part of the deduplicated data system. Additionally or alternatively, location module 106 may operate as a part of a backup system (e.g., that stores data to the deduplicated data system) and locate the backed up versions of the first and second files as a part of the backup system. In some examples, location module 106 may operate as a part of a separate computing system and/or workload (e.g., that communicates with the backup system and/or the deduplicated data system).

Returning to FIG. 3, at step 306, one or more of the systems described herein may analyze a first pattern across the plurality of backed up versions of the first file with which the plurality of backed up versions of the first file reference the corrupted data segment and a second pattern across the plurality of backed up versions of the second file with which the plurality of backed up versions of the second file reference the corrupted data segment. For example, analysis module 108 may, as part of computing device 202 in FIG. 2, analyze pattern 230 across backups 220 of file 222(1) (e.g., across file backups 222(1)(1)-222(1)(n)) with which backups 220 of file 222(1) reference corrupted data segment 210 and pattern 232 across backups 220 of file 222(2) (e.g., across file backups 222(2)(1)-222(2)(m)) with which backups 220 of file 222(2) reference corrupted data segment 210.

The term "pattern," as used herein, may refer to any features which may be used to predict where a clean version of the corrupted data segment may be found. For example, the term "pattern" may refer to the frequency with which the corrupted data segment appears across backed up versions of a file and/or a particular location within backed up versions of a file, the consistency with which the corrupted data segment appears across backed up versions a file and/or a particular location within backed up versions of a file, and/or the times, a clustering of times, the recency, and/or the periodicity with which the corrupted data segment appears across backed up versions of the file.

Analysis module 108 may analyze the first and second patterns in any of a variety of ways. For example, analysis module 108 may calculate the frequency with which the corrupted data segment appears across backed up versions of each file and/or a particular location within backed up versions of each file. Additionally or alternatively, analysis module 108 may measure the consistency with which the corrupted data segment appears across backed up versions each file and/or a particular location within backed up versions of each file. In some examples, analysis module 108 may determine the recency with which the corrupted data segment appears across backed up versions of each file and/or the proximity to a point in time represented by a clean copy of each file with which the corrupted data segment appears across backed up versions of each file.

Analysis module 108 may analyze the first and second patterns in any suitable context. For example, analysis module 108 may operate as a part of the deduplicated data system and analyze the first and second patterns as a part of the deduplicated data system. Additionally or alternatively, analysis module 108 may operate as a part of a backup system (e.g., that stores data to the deduplicated data system) and analyze the first and second patterns as a part of the backup system. In some examples, analysis module 108 may operate as a part of a separate computing system and/or workload (e.g., that communicates with the backup system and/or the deduplicated data system). In some examples, analysis module 108 may generate data describing the first and second patterns. Additionally or alternatively, analysis module 108 may consume data describing the first and second patterns.

Figure 4:
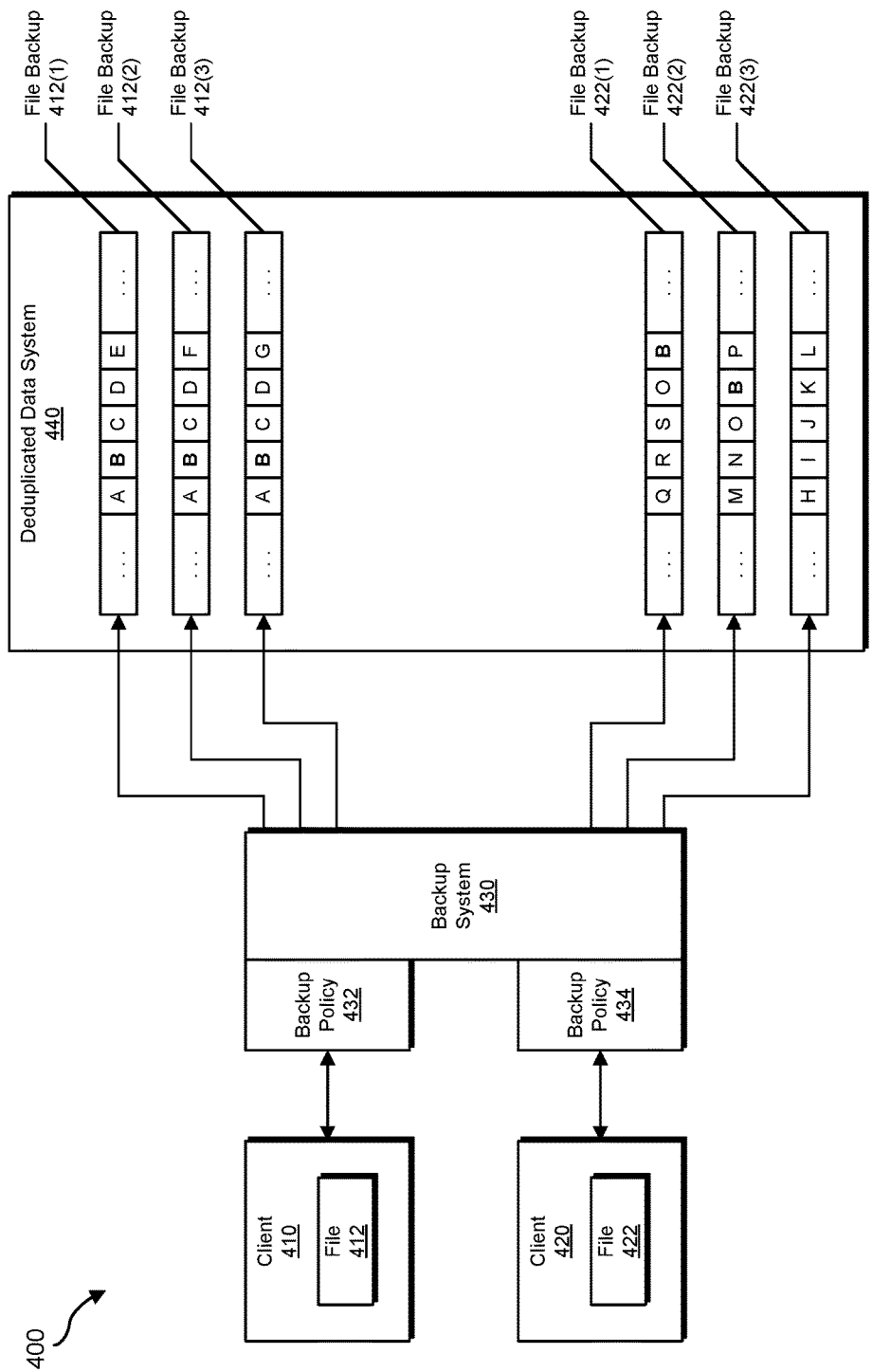
FIG. 4 is a block diagram of an exemplary computing system for repairing corrupted data segments in deduplicated data systems.

As an example of the operation of analysis module 108, FIG. 4 illustrates an exemplary system 400. As shown in FIG. 4, exemplary system 400 may include a client 410, a client 420, a backup system 430, and a deduplicated data system 440. As shown in FIG. 4, backup system 430 may apply a backup policy 432 to client 410, thereby periodically backing up data on client 410, including a file 412. Such backup operations may result in file backups 412(1), 412(2), and 412(3) of file 412 (e.g., representing file 412 at different points in time) stored in deduplicated data system 440. Likewise, backup system 430 may apply a backup policy 434 to client 420, thereby periodically backing up data on client 420, including a file 422. Such backup operations may result in file backups 422(1), 412(2), and 412(3) of file 422 stored in deduplicated data system 440. As shown in FIG. 4, each file backup may be represented as a series of references to deduplicated data segments stored in deduplciated data system 440. Accordingly, file backup 412(1) may include references to deduplicated data segments represented by "A," "B," "C," "D," and "E." In one example, "B" may represent a reference to the corrupted data segment. Accordingly, analysis module 108 may analyze file backups 412 (1)-(3) and determine that a reference to the corrupted data segment ("B") consistently appears across backup versions of file 412 and at a consistent location within file 412. Analysis module 108 may also determine that a reference to the corrupted data segment appears in the most recent backup version of file 412 (i.e., file backup 412(3)). Similarly, analysis module 108 may analyze file backups 422(1)-(3) and determine the lower level of consistency with which references to the corrupted data segment appears across backup versions of file 422 and the lower level of consistency with which references appear at any given location within file backups 422(1)-(3). In addition, analysis module 108 may determine that a reference to the corrupted data segment does not appear in the most recent backup version of file 422 (i.e., file backup 422(3)).

Returning to FIG. 3, at step 308, one or more of the systems described herein may determine, based at least in part on a difference between the first pattern across the plurality of backed up versions of the first file and the second pattern across the plurality of backed up versions of the second file, that a first location within an instance of the first file is more likely to comprise a non-corrupt instance of the corrupted data segment than is a second location within an instance of the second file. For example, determination module 110 may, as part of computing device 202 in FIG. 2, determine, based at least in part on a difference 234 between pattern 230 across backups 220 of file 222(1) and pattern 232 across backups 220 of file 222(2), that location 236 within an instance of file 222(1) (e.g., file 222(1) stored on computing system 206) is more likely to comprise a non-corrupt instance 240 of corrupted data segment 210 than is location 238 within an instance of file 222(2) (e.g., file 222(2) stored on computing system 207).

Determination module 110 may determine that the first location within the first file is more likely to include the non-corrupt instance of the corrupted data segment in any suitable context. For example, determination module 110 may operate as a part of the deduplicated data system and determine that the first location within the first file is more likely to include the non-corrupt instance of the corrupted data segment as a part of the deduplicated data system. Additionally or alternatively, determination module 110 may operate as a part of a backup system (e.g., that stores data to the deduplicated data system) and determine that the first location within the first file is more likely to include the non-corrupt instance of the corrupted data segment as a part of the backup system. In some examples, determination module 110 may operate as a part of a separate computing system and/or workload (e.g., that communicates with the backup system and/or the deduplicated data system).

Determination module 110 may determine that the first location within the first file is more likely to comprise a non-corrupt instance of the corrupted data segment than is the second location within the second file in any of a variety of ways. For example, determination module 110 may rank the files and/or the locations within the files based on the patterns observed within the files. For example, determination module 110 may generate a score and/or a ranking based on (1) the frequency with which references to the non-corrupted instance of the corrupted data segment appear across backed up versions of a file (e.g., where a higher frequency results in a higher score and/or ranking), (2) the consistency with which references to the non-corrupted instance of the corrupted data segment appear across backed up versions of a file and/or at given locations across backed up versions of a file (e.g., where a higher consistency results in a higher score and/or ranking), and/or (3) the recency with which references to the non-corrupted instance of the corrupted data segment appear across backed up versions of a file (e.g., where more recent references and/or a longer unbroken string of recent references results in a higher score and/or ranking). In some examples, determination module 110 may use additional factors in generating the ranking and/or score, such as the size of the file (e.g., where a smaller file results in a higher ranking and/or score), the type of file (e.g., where file types designated as more stable result in higher rankings and/or scores), and/or the original storage location of the file (e.g., where file paths with matching certain patterns indicate more or less stability and therefore result in a higher and/or lower ranking and/or score).

Determination module 110 may select the first location and the second location (e.g., for purposes of ranking the first and second locations) in any suitable manner. For example, determination module 110 may select the first location and the second location based on results generated by analysis module 108. In some examples, one or more of the systems described herein (e.g., analysis module 108 and/or determination module 110) may select, score, and/or rank each location in each file where a reference to the corrupted data segment has been observed in any backup version of the file. In some examples, determination module 110 may use one or more heuristics related to the ranking approaches described above to select candidate files and/or candidate locations within candidate files for scoring and/or ranking. In some examples, determination module 110 may select the first location within the instance of the first file based on a location within one or more of the plurality of backed up versions of the first file at which the corrupted data segment is referenced.

In some examples, determination module 110 may determine that the first location within the instance of the first file is more likely to include the non-corrupt instance of the corrupted data segment than is the second location within the instance of the second file by determining that the corrupted data segment is referenced across the plurality of backed up versions of the first file more consistently than the corrupted data segment is referenced across the plurality of backed up versions of the second file. For example, determination module 110 may determine that a larger number and/or a higher percentage of the backed up versions of the first file include a reference to the corrupted data segment than do the backed up versions of the second file.

In some examples, determination module 110 may determine that the first location within the instance of the first file is more likely to include the non-corrupt instance of the corrupted data segment than is the second location within the instance of the second file by determining that the corrupted data segment is referenced at the first location across the plurality of backed up versions of the first file more consistently than the corrupted data segment is referenced at the second location across the plurality of backed up versions of the second file. For example, even in an example where the backed up versions of the second file reference the corrupted data segment as often or more often than the backed up versions of the first file, determination module 110 may determine that the appearances of references to the corrupted data segment across backed up versions of the first file occur more consistently at the same location than do appearances of references to the corrupted data segment across backed up versions of the second file. In some examples, determination module 110 may assess consistency of location of references to the corrupted data segment by an exact location of the reference to the data segment. Additionally or alternatively, determination module 110 may assess consistency of location of references to the corrupted data segment according to a window of locations and/or an statistical proximity of references to the corrupted data segment.

In some examples, determination module 110 may determine that the first location within an instance of the first file is more likely to include the non-corrupt instance of the corrupted data segment than is the second location within the instance of the second file by determining that a proximity between a timestamp of a backed up version of the first file that references the corrupted data segment and a timestamp of the instance of the first file exceeds a proximity between a timestamp of a backed up version of the second file that references the corrupted data segment and a timestamp of the instance of the second file. For example, determination module 110 may determine that the first location of a backup version of the first file included a reference to the corrupted data segment and that the backup version of the first file represents the state of the first file at a time that is proximate to a point-in-time representation of the first file by an existing clean copy of the first file. Determination module 110 may thereby score the existing clean copy of the first file as likely referencing the corrupted data segment at the first location within the clean copy of the first file (e.g., because it may be unlikely that the first file changed at the first location between the time of the backup version of the first file and the time at which the existing clean copy of the first file was created).

In some examples, determination module 110 may determine that the first location within the instance of the first file is more likely to include the non-corrupt instance of the corrupted data segment than is the second location within the instance of the second file by calculating a ranking across a plurality of files that may include the first file and the second file and determining that the first file precedes the second file in the ranking. For example, determination module 110 may generate a ranking including many files and/or including many locations within many files. In some examples, the systems described herein may systematically check the files and/or locations within the files in the order in which they appear in the ranking until a suitable source for a non-corrupt instance of the corrupted data segment is found. Accordingly, where determination module 110 determines that the first location within the instance of the first file is more likely to include the non-corrupt instance of the corrupted data segment than is the second location within the instance of the second file, the systems described herein may check the first file and/or the first location of the first file before checking the second file and/or the second location of the second file (and may never check the second file where the non-corrupt instance of the corrupted data segment was successfully recovered from the first file).

Using FIG. 4 as an example, determination module 110 may, based on the patterns of references to the corrupted data segment by (a) file backups 412(1)-(3) and (b) file backups 422(1)-(3), respectively, determine that file 412 is more likely to include the non-corrupt instance of the corrupted data segment referenced by "B" (at, e.g., a predictable location within the file) than is file 422. For example, determination module 110 may determine that because "B" appears in each of file backups 412(1)-(3), because "B" appears in the same location in each of file backups 412(1)-

(3), and because "B" appears in the most recent backup of file 412 (i.e., file backup 412(3)), that "B" may be reliably and/or inexpensively located within file 412. Similarly, determination module 110 may determine that because "B" does not appear as frequently in file backups 422(1)-(3), because "B" does not appear as reliably in the same location in file backups 422(1)-(3), and/or because "B" does not appear in the most recent backup of file 422 (i.e., file backup 422(3)), that "B" may be less reliably located within file 422. Accordingly, determination module 110 may place a higher priority, ranking, and/or score on file 412 for locating a non-corrupt instance of the corrupted data segment than on file 422.

Returning to FIG. 3, at step 310, one or more of the systems described herein may retrieve, based at least in part on determining that the instance of the first file is more likely to comprise the non-corrupt instance of the corrupted data segment, the non-corrupt instance of the corrupted data segment from the first location within the instance of the first file. For example, retrieving module 112 may, as part of computing device 202 in FIG. 2, retrieve, based at least in part on determining that the instance of file 222(1) is more likely to comprise non-corrupt instance 240 of corrupted data segment 210, non-corrupt instance 240 of corrupted data segment 210 from location 236 within the instance of file 222(1).

Retrieving module 112 may retrieve the non-corrupt instance of the corrupted data segment in any suitable context. For example, retrieving module 112 may operate as a part of the deduplicated data system and retrieve the non-corrupt instance of the corrupted data segment as a part of the deduplicated data system. Additionally or alternatively, retrieving module 112 may operate as a part of a backup system (e.g., that stores data to the deduplicated data system) and retrieve the non-corrupt instance of the corrupted data segment as a part of the backup system. In some examples, retrieving module 112 may operate as a part of a separate computing system and/or workload (e.g., that communicates with the backup system and/or the deduplicated data system).

Retrieving module 112 may retrieve the non-corrupt instance of the corrupted data segment from the first location within the instance of the first file in any of a variety of ways. In some examples, retrieving module 112 may first check a fingerprint at the first location within the instance of the first file to determine that a data segment at the first location within the instance of the first file includes the non-corrupt instance of the corrupted data segment before retrieving the non-corrupt instance of the corrupted data segment. For example, retrieving module 112 may compare the fingerprint of the first location within the instance of the first file with a fingerprint of the corrupted data segment (generated before the data segment was corrupted) that is used by the deduplicated data system to identify and/or reference the corrupted data segment. In this example, retrieving module 112 may retrieve the non-corrupt instance of the data segment on the basis of the fingerprint of the non-corrupt instance of the data segment matching the fingerprint within the deduplicated data system.

In some examples, retrieving module 112 may retrieve the non-corrupt instance of the corrupted data segment from the first location by retrieving the non-corrupt instance of the corrupted data segment without retrieving an entire copy of the instance of the first file. For example, retrieving module 112 may read only the corrupted data segment from the first file and/or may transmit only the corrupted data segment from the storage location of the first file to the deduplicated data system. Additionally or alternatively, retrieving module 112 may retrieve a minimum readable and/or minimum transmittable data chuck that includes the entire non-corrupt instance of the corrupted data segment (but which represents only a portion of the first file).

In some examples, retrieving module 112 may retrieve the non-corrupt instance of the corrupted data segment from the first location within the instance of the first file by retrieving the non-corrupt instance of the corrupted data segment from a source from which the plurality of backup versions of the first file were taken. For example, retrieving module 112 may query the deduplicated data system and/or a backup system that stores data to the deduplicated data system to determine the storage location of the first file (e.g., a live version of the first file from which the backups versions of the first file were generated). Retrieving module 112 may then read the non-corrupt instance of the corrupted data segment (and/or generate a request to fetch the non-corrupt instance of the corrupted data segment) from the first file.

In some examples, retrieving module 112 may retrieve the non-corrupt instance of the corrupted data segment from the first location within the instance of the first file by retrieving the non-corrupt instance of the corrupted data segment from a backup stored outside the deduplicated data system. For example, retrieving module 112 may identify a duplicate, a mirror, and/or an alternative backup that stores a version of the first file and that does not store data within the deduplicated data system. Retrieving module 112 may then read the non-corrupt instance of the corrupted data segment from the identified instance of the first file.

In some examples, retrieving module 112 may retrieve one or more candidate data segments only to discover that the data segments do not match the corrupted data segment. Additionally or alternatively, retrieving module 112 may skip retrieving one or more candidate data segments based on determining that the data segments do not match the corrupted data segment. For example, a third file may precede the first file in the ranking. However, retrieving module 112 may check a fingerprint at a third location within an instance of the third file and thereby determine that a data segment at the third location within the instance of the third file does not include the non-corrupt instance of the corrupted data segment. Accordingly, retrieving module 112 may, after determining that the third location within the instance of the third file does not include the non-corrupt instance of the corrupted data segment, continue to retrieving the non-corrupted data segment from the first location within the instance of the first file instead (because, e.g., the third file succeeds the first file in the ranking of candidate files).

In some examples, retrieving module 112 may directly read the non-corrupt instance of the data segment. In some examples, the non-corrupt instance of the data segment may not be directly accessible to retrieving module 112. Accordingly, in these examples, retrieving module 112 may request a backup system that generated the backups that include the first file to create a backup of the non-corrupt instance of the data segment (e.g., in isolation) from the instance of the first file stored in the backup source (e.g., because the backup system may have permissions and/or a data path to access the first file stored in the backup source).

Figure 5:
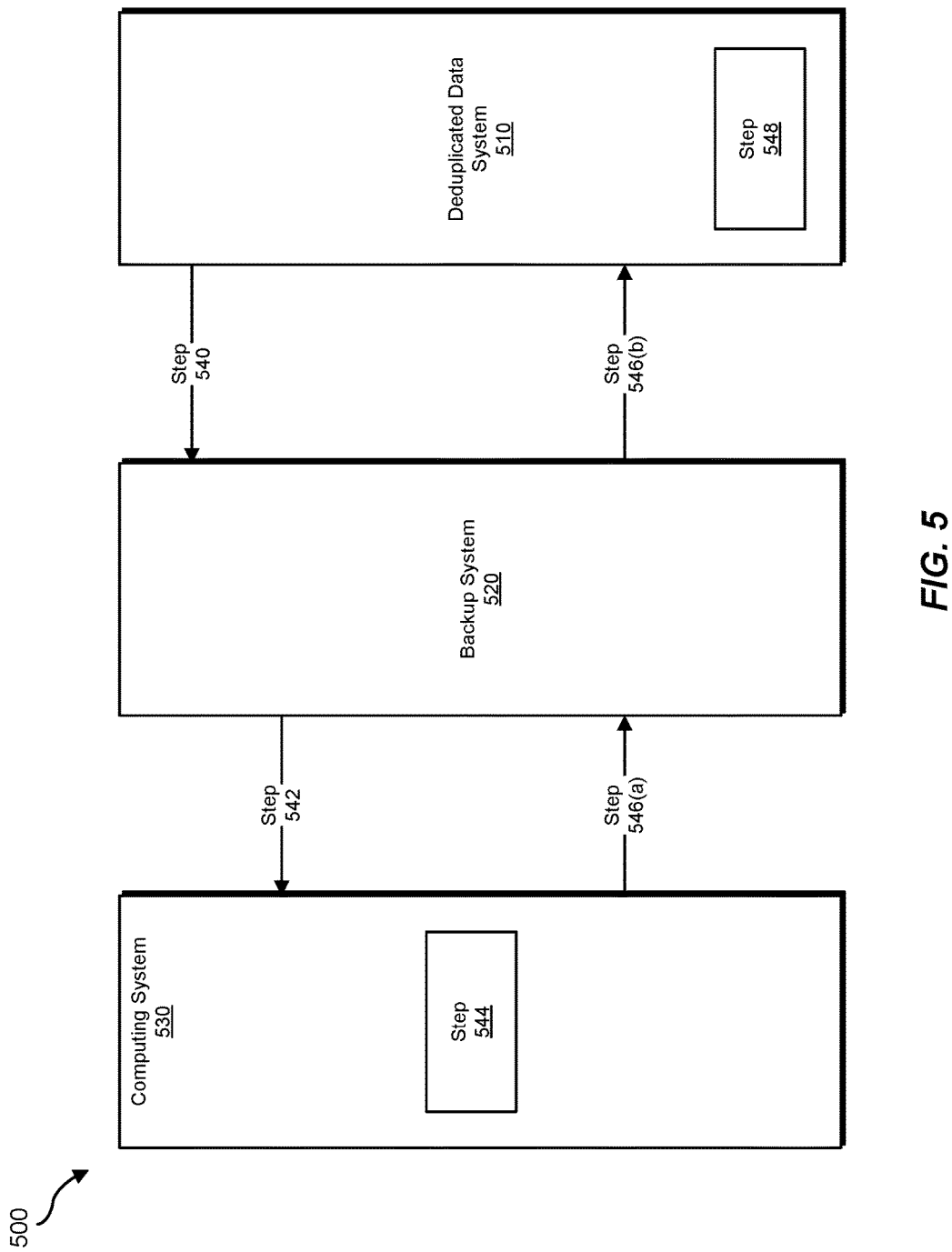
FIG. 5 is a block diagram of an exemplary computing system for repairing corrupted data segments in deduplicated data systems.

To show an example of the operation of retrieving module 112, FIG. 5 illustrates an exemplary system 500. As shown in FIG. 5, system 500 may include a deduplicated data system 510, a backup system 520 (that, e.g., stores backup data via deduplicated data system 510), and a computing system 530. In one example, deduplicated data system 510 may identify a corrupted data segment. Accordingly, at step 540, deduplicated data system 510 may issue a request to backup system 520 to repair the corrupted data segment (e.g., with information for identifying the corrupted data segment, including correct fingerprint information for the data segment). At step 542, backup system 520 may then issue a command to computing system 530 to search candidate files for the corrupted data segment (e.g., at one or more expected locations). At step 544, computing system 530 may locate a non-corrupt instance of the corrupted data segment. At step 546(*a*), computing system 530 may forward the non-corrupt instance of the corrupted data segment to backup system 520 (and/or may request backup system 520 to retrieve the non-corrupt instance from a specified location). At step 546(*b*), backup system 520 may transmit the non-corrupt instance of the corrupted data segment to deduplicated data system 510. As will be explained in greater detail below, at step 548 deduplicated data system 510 may repair the corrupted data segment with the non-corrupt instance of the data segment.

As described above, in various examples the systems described herein may analyze the backups of two or more files to determine which files (e.g., source copies and/or copies of the files otherwise stored outside the deduplicated data system) are likely candidates for currently containing a non-corrupt instance of the corrupted data segment. However, in some examples, the systems described herein may identify only one candidate file. In these examples, retrieving module 112 may simply attempt to retrieve the non-corrupt instance of the corrupted data segment from the only candidate file (e.g., an instance of the candidate file stored outside the deduplicated data system).

Returning to FIG. 3, at step 312, one or more of the systems described herein may repair the corrupted data segment with the non-corrupt instance of the corrupted data segment. For example, repairing module 114 may, as part of computing device 202 in FIG. 2, repair corrupted data segment 210 with non-corrupt instance 240 of corrupted data segment 210.

Repairing module 114 may repair the corrupted data segment with the non-corrupt instance of the corrupted data segment in any suitable manner. For example, repairing module 114 may replace the corrupted data segment with the non-corrupt instance of the corrupted data segment. Additionally or alternatively, in examples where the corrupted data segment was missing from the deduplicated data system, repairing module 114 may repair the corrupted data segment by adding the non-corrupt instance of the corrupted data segment as a new entry to the deduplicated data system. In some examples, repairing module 114 may repair and/or update reference information to correctly point to the non-corrupt instance of the corrupted data segment.

Repairing module 114 may repair the corrupted data segment with the non-corrupt instance of the corrupted data segment in any suitable context. For example, repairing module 114 may operate as a part of the deduplicated data system and repair the corrupted data segment with the non-corrupt instance of the corrupted data segment as a part of the deduplicated data system. Additionally or alternatively, repairing module 114 may operate as a part of a backup system (e.g., that stores data to the deduplicated data system) and repair the corrupted data segment with the non-corrupt instance of the corrupted data segment as a part of the backup system. In some examples, repairing module 114 may operate as a part of a separate computing system and/or workload (e.g., that communicates with the backup system and/or the deduplicated data system).

As explained above in connection with method 300 in FIG. 3, the systems described herein may fetch healthy data for a corrupted segment from the source location in the primary storage or from another copy of the data. If the content of a source data set, which contains the corrupted data segment, is stable, and/or if the content around the corrupted data segment is stable, the systems described herein may estimate that the content of the source data set has a high potential to still contain the healthy data at and/or around the same location as the data existed before. By locating and transferring the healthy data only, the systems described herein may reduce the data movement and data processing needed to repair corrupted deduplicated data.

In one example, the systems described herein may repair a corrupted data segment by (1) finding the backups which reference the corrupted data segment and group the backups by different data sources, (2) in each backup group, determine the list of source files that map to the corrupted data segment, (3) score the source files based on data stability around the corrupted data segment in the various versions of the backups and/or based on the location of corrupted data segment in the various versions of the backups, where source files with more stability in location of and/or in data changes around the data segment receive higher scores, and smaller files receive higher scores, (4) select the top n source files with the highest scores as candidate files, (5) at each candidate file's source location at the same position as the corrupted segment, calculate the data fingerprint using a minimal anchor window until the location of the data segment is found, then transfer the data segment to the deduplicated data system to replace the corrupted data segment (or, where the source location cannot be accessed directly, a deduplication system may integrate with an agent and may request the agent to back up the relevant parts of the candidate files). In cases where the data is not found in any of the n candidate files, the systems described herein may fail over to a different repair and/or reporting process.

In this manner, the systems described herein may increase the success rate of data repair while minimizing data movement between the primary storage and the deduplication system. By increasing the success rate and the speed of data repair, these systems may prevent data loss from spreading widely over a series of backups that reference the same data segment.

Figure 6:
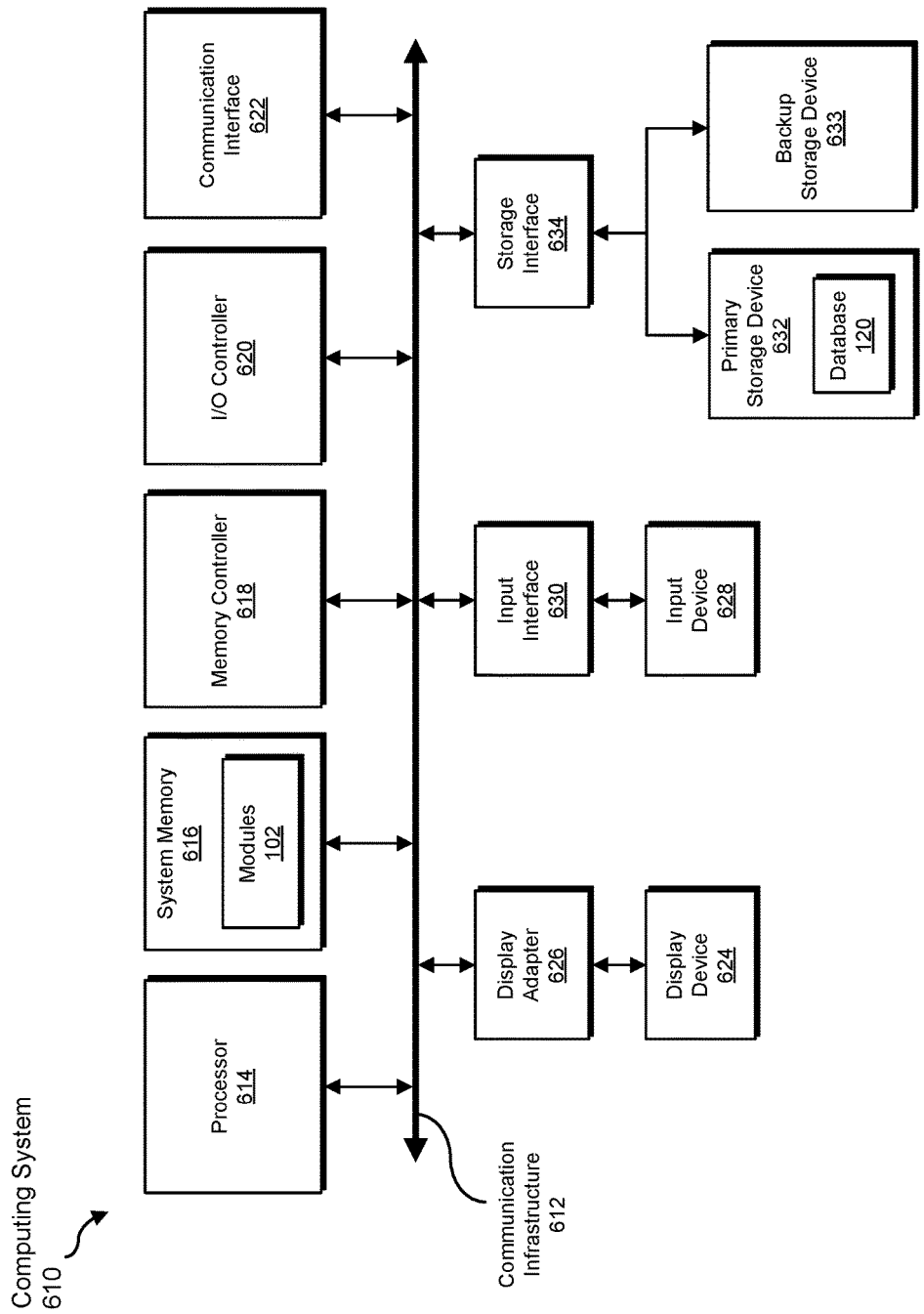
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
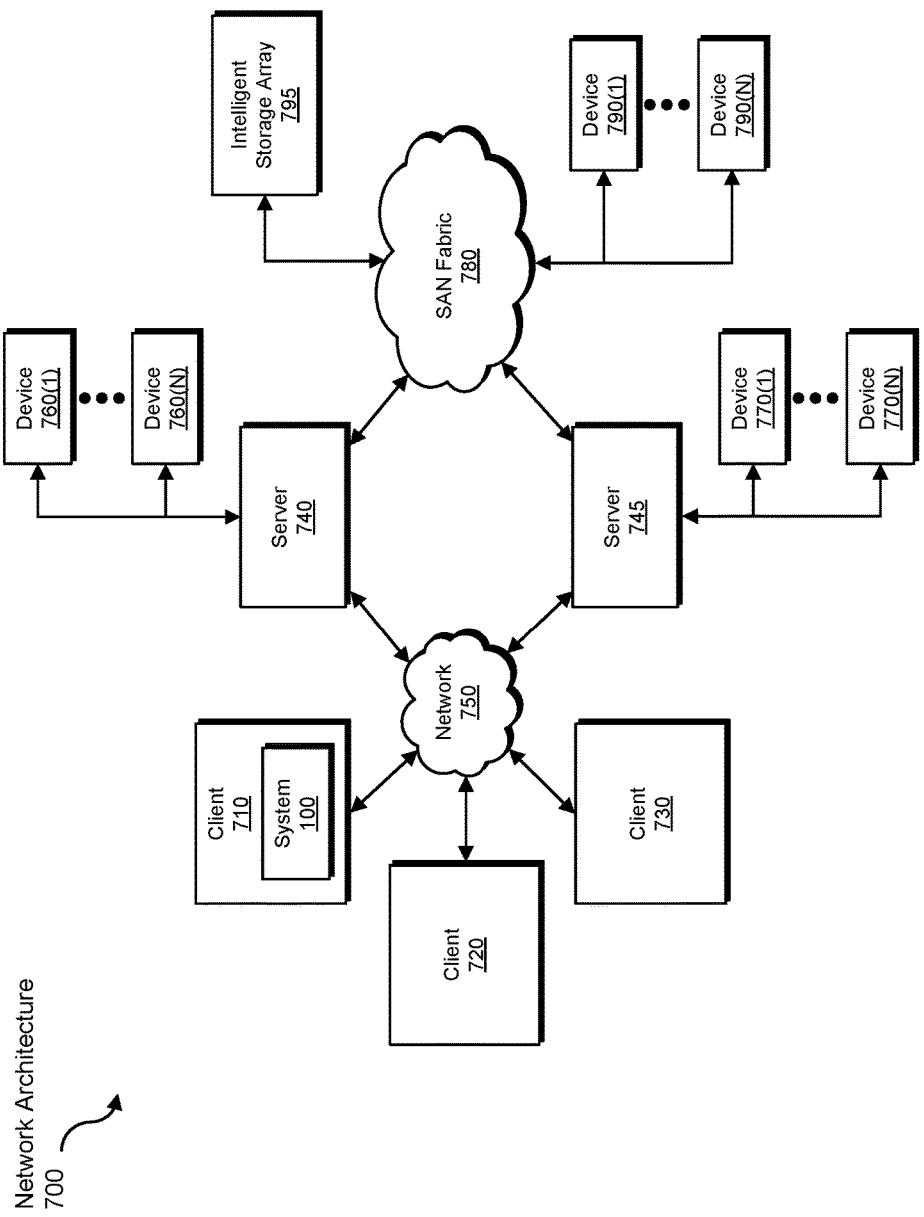
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for repairing corrupted data segments in deduplicated data systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a corrupted data segment to be transformed, transform the corrupted data segment, output a result of the transformation to a deduplicated data system, use the result of the transformation to repair data within the deduplicated data system, and store the result of the transformation to the deduplicated data system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for repairing corrupted data segments in deduplicated data systems, at least a portion of the method being performed by a computing device comprising at least one processor, the method comprising:
   segmenting each file included in a plurality of files into a plurality of data segments;
   storing each unique data segment included in the plurality of data segments in a deduplicated data system, each unique data segment being a unit of data referenced by at least one file included in the plurality of files;
   identifying a corrupted data segment within the deduplicated data system; and
   in response to identifying the corrupted data segment within the deduplicated data system:
      determining that the corrupted data segment is referenced by at least one version of a first file included in a plurality of backed up versions of the first file;
      determining that the corrupted data segment is referenced by at least one version of a second file included in a plurality of versions of the second file;
      analyzing a first pattern across the plurality of backed up versions of the first file with which the plurality of backed up versions of the first file reference the corrupted data segment;
      analyzing a second pattern across the plurality of backed up versions of the second file with which the plurality of backed up versions of the second file reference the corrupted data segment;
      determining, based at least in part on a difference between the first pattern across the plurality of backed up versions of the first file and the second pattern across the plurality of backed up versions of the second file, that a first location within an instance of the first file is more likely to comprise a non-corrupt instance of the corrupted data segment than is a second location within an instance of the second file;
      retrieving, based at least in part on determining that the instance of the first file is more likely to comprise the non-corrupt instance of the corrupted data segment, the non-corrupt instance of the corrupted data segment from the first location within the instance of the first file; and
      repairing the corrupted data segment with the non-corrupt instance of the corrupted data segment.

2. The computer-implemented method of claim 1, wherein retrieving the non-corrupt instance of the corrupted data segment from the first location comprises retrieving the non-corrupt instance of the corrupted data segment without retrieving an entire copy of the instance of the first file.

3. The computer-implemented method of claim 1, wherein retrieving the non-corrupt instance of the corrupted data segment from the first location within the instance of the first file comprises retrieving the non-corrupt instance of the corrupted data segment from a source from which the plurality of backed up versions of the first file were taken.

4. The computer-implemented method of claim 1, wherein retrieving the non-corrupt instance of the corrupted data segment from the first location within the instance of the first file comprises retrieving the non-corrupt instance of the corrupted data segment from a backup stored outside the deduplicated data system.

5. The computer-implemented method of claim 1, further comprising checking a fingerprint at the first location within the instance of the first file to determine that a data segment at the first location within the instance of the first file comprises the non-corrupt instance of the corrupted data segment before retrieving the non-corrupt instance of the corrupted data segment.

6. The computer-implemented method of claim 1, further comprising selecting the first location within the instance of the first file based on a location within one or more of the plurality of backed up versions of the first file at which the corrupted data segment is referenced.

7. The computer-implemented method of claim 1, wherein determining that the first location within the instance of the first file is more likely to comprise the non-corrupt instance of the corrupted data segment than is the second location within the instance of the second file comprises determining that the corrupted data segment is referenced across the plurality of backed up versions of the first file more consistently than the corrupted data segment is referenced across the plurality of backed up versions of the second file.

8. The computer-implemented method of claim 1, wherein determining that the first location within the instance of the first file is more likely to comprise the non-corrupt instance of the corrupted data segment than is the second location within the instance of the second file comprises determining that the corrupted data segment is referenced at the first location across the plurality of backed up versions of the first file more consistently than the corrupted data segment is referenced at the second location across the plurality of backed up versions of the second file.

9. The computer-implemented method of claim 1, wherein determining that the first location within an instance of the first file is more likely to comprise the non-corrupt instance of the corrupted data segment than is the second location within the instance of the second file comprises determining that a proximity between a timestamp of a backed up version of the first file that references the corrupted data segment and a timestamp of the instance of the first file exceeds a proximity between a timestamp of a backed up version of the second file that references the corrupted data segment and a timestamp of the instance of the second file.

10. The computer-implemented method of claim 1, wherein retrieving the non-corrupt instance of the corrupted data segment from the first location within the instance of the first file is based at least in part on determining that the first file is smaller than the second file.

11. The computer-implemented method of claim 1, wherein
determining that the first location within the instance of the first file is more likely to comprise the non-corrupt instance of the corrupted data segment than is the second location within the instance of the second file comprises:
calculating a ranking across a plurality of files that comprises the first file and the second file; and
determining that the first file precedes the second file in the ranking.

12. The computer-implemented method of claim 11, wherein a third file precedes the first file in the ranking;
wherein the method further comprises checking a fingerprint at a third location within an instance of the third file and thereby determining that a data segment at the third location within the instance of the third file does not comprise the non-corrupt instance of the corrupted data segment; and
wherein retrieving the non-corrupt instance of the corrupted data segment from the first location within the instance of the first file instead of from the third location within the instance of the third file is based at least in part on determining that the data segment at the third location within the instance of the third file does not comprise the non-corrupt instance of the corrupted data segment and at least in part on the first file succeeding the third file in the ranking.

13. The computer-implemented method of claim 1, wherein retrieving the non-corrupt instance of the corrupted data segment from the first location comprises retrieving the non-corrupt instance of the corrupted data segment without reading portions of the instance of the first file other than the non-corrupt instance of the corrupted data segment.

14. The computer-implemented method of claim 1, wherein retrieving the non-corrupt instance of the corrupted data segment from the first location comprises requesting a backup of a single data segment at the first location of the instance of the first file.

15. A system for repairing corrupted data segments in deduplicated data systems, the system comprising:
an identification module, stored in memory, that identifies a corrupted data segment within a deduplicated data system, segments each file included in a plurality of files generating a plurality of data segments, and stores each unique data segment in the deduplicated data system, each unique data segment being a unit of data referenced by at least one file included in the plurality of files;
a location module, stored in memory, that, in response to the identifying of the corrupted data segment within the deduplicated data system:
determines that the corrupted data segment is referenced by at least one version of a first file included in a plurality of backed up versions of the first file;
determines that the corrupted data segment is referenced by at least one version of a second file included in a plurality of backed up versions of the second file;
an analysis module, stored in memory, that analyzes a first pattern across the plurality of backed up versions of the first file with which the plurality of backed up versions of the first file reference the corrupted data segment and analyzes a second pattern across the plurality of backed up versions of the second file with which the plurality of backed up versions of the second file reference the corrupted data segment;
a determination module, stored in memory, that determines, based at least in part on a difference between the first pattern across the plurality of backed up versions of the first file and the second pattern across the plurality of backed up versions of the second file, that a first location within an instance of the first file is more likely to comprise a non-corrupt instance of the corrupted data segment than is a second location within an instance of the second file;
a retrieving module, stored in memory, that retrieves, based at least in part on determining that the instance of the first file is more likely to comprise the non-corrupt instance of the corrupted data segment, the non-corrupt instance of the corrupted data segment from the first location within the instance of the first file;
a repairing module, stored in memory, that repairs the corrupted data segment with the non-corrupt instance of the corrupted data segment; and
at least one physical processor configured to execute the identification module, the location module, the analysis module, the determination module, the retrieving module, and the repairing module.

16. The system of claim 15, wherein the retrieving module retrieves the non-corrupt instance of the corrupted data segment from the first location by retrieving the non-corrupt instance of the corrupted data segment without retrieving an entire copy of the instance of the first file.

17. The system of claim 15, wherein the retrieving module retrieves the non-corrupt instance of the corrupted data segment from the first location within the instance of the first file by retrieving the non-corrupt instance of the corrupted data segment from a source from which the plurality of backed up versions of the first file were taken.

18. The system of claim 15, wherein the retrieving module retrieves the non-corrupt instance of the corrupted data segment from the first location within the instance of the first file by retrieving the non-corrupt instance of the corrupted data segment from a backup stored outside the deduplicated data system.

19. The system of claim 15, wherein the retrieving module further checks a fingerprint at the first location within the instance of the first file to determine that a data segment at the first location within the instance of the first file comprises the non-corrupt instance of the corrupted data segment before retrieving the non-corrupt instance of the corrupted data segment.

20. A non-transitory computer-readable medium comprising one or more computer-readable instructions that, when executed by at least one processor of a computing device, cause the computing device to:
segment each file included in a plurality of files into a plurality of data segments;
store each unique data segment included in the plurality of data segments in a deduplicated data system, each unique data segment being a unit of data referenced by at least one file included in the plurality of files;

identify a corrupted data segment within a deduplicated data system; and in response to identifying the corrupted data segment within the deduplicated data system:

determine that the corrupted data segment is referenced by at least one version of a first file included in a plurality of backed up versions of the first file;

determine that the corrupted data segment is referenced by at least one version of a second file included in a plurality of backed up versions of the second file;

analyze a first pattern across the plurality of backed up versions of the first file with which the plurality of backed up versions of the first file reference the corrupted data segment;

analyze a second pattern across the plurality of backed up versions of the second file with which the plurality of backed up versions of the second file reference the corrupted data segment;

determine, based at least in part on a difference between the first pattern across the plurality of backed up versions of the first file and the second pattern across the plurality of backed up versions of the second file, that a first location within an instance of the first file is more likely to comprise a non-corrupt instance of the corrupted data segment than is a second location within an instance of the second file;

retrieve, based at least in part on determining that the instance of the first file is more likely to comprise the non-corrupt instance of the corrupted data segment, the non-corrupt instance of the corrupted data segment from the first location within the instance of the first file; and repair the corrupted data segment with the non-corrupt instance of the corrupted data segment.

\* \* \* \* \*